(12) United States Patent
Bredahl

(10) Patent No.: US 9,861,237 B2
(45) Date of Patent: Jan. 9, 2018

(54) USE OF A TACKY MAT FOR SECURING A PORTABLE ROLL DISPENSER TO A HORIZONTAL SURFACE AND PORTABLE ROLL DISPENSER

(75) Inventor: Gunnar Bredahl, Worms (DE)

(73) Assignee: SCA Hygiene Products AB, Gothenburg (SE)

( * ) Notice: Subject to any disclaimer, the term of this patent is extended or adjusted under 35 U.S.C. 154(b) by 74 days.

(21) Appl. No.: 14/388,344

(22) PCT Filed: Mar. 28, 2012

(86) PCT No.: PCT/EP2012/055553
§ 371 (c)(1),
(2), (4) Date: Sep. 26, 2014

(87) PCT Pub. No.: WO2013/143590
PCT Pub. Date: Oct. 3, 2013

(65) Prior Publication Data
US 2015/0053812 A1  Feb. 26, 2015

(51) Int. Cl.
*B32B 37/00* (2006.01)
*A47K 10/38* (2006.01)
(Continued)

(52) U.S. Cl.
CPC ...... *A47K 10/3818* (2013.01); *B32B 37/1284* (2013.01); *B65D 83/0805* (2013.01); *C08G 18/10* (2013.01); *C08G 18/283* (2013.01); *C08G 18/4829* (2013.01); *A47K 2010/3233* (2013.01); *B32B 2375/00* (2013.01); *B32B 2405/00* (2013.01)

(58) Field of Classification Search
CPC .... A47K 10/38; A47K 10/42; A47K 10/3818; A47K 2010/3233; A47K 2010/3266; A47K 10/3827; B42D 5/005; B32B 37/0076; B32B 37/0084; B32B 43/006; B29C 65/50; B29C 65/5007; Y10T 156/11; Y10T 156/1105; Y10T 156/1179
USPC .......................................... 156/247, 249, 290
See application file for complete search history.

(56) References Cited

U.S. PATENT DOCUMENTS 3,515,773 A * 6/1970 Rolf ....................... C08G 18/10
427/393.5
4,552,944 A 11/1985 Kamiyama et al.
(Continued)

FOREIGN PATENT DOCUMENTS

DE  20 2008 005 552 U1  7/2008
EP       1 249 480 A1    10/2002
(Continued)

OTHER PUBLICATIONS

Machine translation of JP 2011-74333 date unknown.*
(Continued)

*Primary Examiner* — John Goff
(74) *Attorney, Agent, or Firm* — Buchanan Ingersoll & Rooney PC

(57) ABSTRACT

A tacky mat is made from a tacky elastomeric polymer composition for releasably securing a portable roll dispenser to a surface and a portable roll dispenser on which a tacky mat is arranged, preferably on the bottom of the dispenser, wherein the mat is made from a tacky elastomeric polymer composition.

39 Claims, 4 Drawing Sheets

(51) Int. Cl.
*C08G 18/48* (2006.01)
*C08G 18/10* (2006.01)
*C08G 18/28* (2006.01)
*B32B 37/12* (2006.01)
*B65D 83/08* (2006.01)
*A47K 10/32* (2006.01)

(56) References Cited

U.S. PATENT DOCUMENTS

| | | | |
|---|---|---|---|
| 5,165,570 A * | 11/1992 | Windorski | B42D 5/005 |
| | | | 221/45 |
| 5,582,362 A | 12/1996 | Johnson et al. | |
| 5,650,215 A * | 7/1997 | Mazurek | B29C 43/222 |
| | | | 428/156 |
| 6,403,206 B1 * | 6/2002 | Bries | A47G 1/175 |
| | | | 428/220 |
| 6,561,378 B1 | 5/2003 | Roessler et al. | |
| 6,630,218 B1 | 10/2003 | Abe | |
| 7,530,472 B2 | 5/2009 | Bitowft et al. | |
| 2003/0054164 A1 | 3/2003 | Zimmermann et al. | |
| 2003/0116582 A1 * | 6/2003 | Tosdale | A47K 10/3818 |
| | | | 221/70 |
| 2004/0265529 A1 * | 12/2004 | Luhmann | C08G 18/4808 |
| | | | 428/40.1 |
| 2007/0066788 A1 | 3/2007 | Hoffmann et al. | |
| 2007/0261274 A1 | 11/2007 | Fox et al. | |
| 2008/0214769 A1 * | 9/2008 | Pohl | C08G 18/12 |
| | | | 528/44 |
| 2010/0001015 A1 | 1/2010 | Thoren et al. | |

FOREIGN PATENT DOCUMENTS

| | | |
|---|---|---|
| JP | 2011074333 A * | 4/2011 |
| SE | 519 199 C2 | 1/2003 |
| WO | WO 2008/085090 A1 | 7/2008 |

OTHER PUBLICATIONS

Human Translation of JP 2011-074333 date unknown.*
International Search Report (PCT/ISA/210) dated Nov. 22, 2014, by the European Patent Office as the International Searching Authority for International Application No. PCT/EP2012/055553.
Written Opinion (PCT/ISA/237) dated Nov. 22, 2012, by the European Patent Office as the International Searching Authority for International Application No. PCT/EP2012/055553.
International Preliminary Report on Patentability (PCT/IPEA/409) dated Mar. 4, 2014, by the European Patent Office as the International Searching Authority for International Application No. PCT/EP2012/055553.
Examination Report dated Apr. 19, 2016 issued in the corresponding Colombian Patent Application No. 14-238074-4 (2 pages).

* cited by examiner

USE OF A TACKY MAT FOR SECURING A PORTABLE ROLL DISPENSER TO A HORIZONTAL SURFACE AND PORTABLE ROLL DISPENSER

The present invention relates to the use of a tacky mat made from a tacky elastomeric polymer composition for releasably (and reusably) securing a dispenser for dispensing sheet material to a vertical or preferably horizontal surface. The present invention also relates to a dispenser on which a tacky mat is arranged.

TECHNICAL BACKGROUND

Sheet material such as paper and nonwoven products are frequently provided to the consumer in the form of roll or piles encased in a suitable dispenser. Typically, roll dispensers such as centre-fed roll dispensers are permanently affixed to a wall. Recently, there has been an increasing interest in portable dispensers that are releasably affixed to the wall by means of a suitable holding device.

It is considered desirable by consumers to make such a dispenser portable so that it can be wall mounted if desired and can also be moved around a usage site if desired. WO 2008/085090 A1 discloses a portable dispenser for a centre-fed roll of sheet material. This dispenser is made of a soft, flexible, textile type material. The soft dispenser includes a handle to allow it to be carried around and used where desired. However, the tissue dispensing action requires a two-handed operation, one hand for stabilizing the dispenser, such as at the handle, and the other hand for pulling and tearing the sheet material. Otherwise, the dispenser would either tilt over or move once an attempt is made to pull and tear the sheet material.

Although the art has already explored various means for securing dispensers to a horizontal surface, these means are either not transferable to portable roll dispensers and/or have been found unsatisfactorily for technical or other reasons.

SE 519 199 C2 relates to a cylindrical cover shrink-fitted around a toilet roll and covering at least the outer end sections of the two flat end surfaces of the toilet roll. Paper is removed via an opening located in the middle of one of these end surfaces. The cylinder-shaped surface of the cover includes a fastening means, preferably velcro or adhesive fastening means for securing it to a surface on which the dispenser is to be supported. It is also disclosed that when using an adhesive fastening means it should preferably be possible to repeatedly remove the strip and re-attach it to another surface. A protective strip covers the strip prior to use.

Double-sided adhesive tapes with a sufficiently strong adhesive force tend to leave adhesive residues if they are removed from the surface to which the dispenser has been secured. This applies in particular to rough surface materials such as wooden tables. If the adhesive force is adjusted to be smaller, it is often insufficient to secure the dispenser or it quickly drops after repeated use. The adhesive polymers are easily soiled with dust, grease or other dirt which drastically reduces their adhesive effect. Therefore, it would be desirable to provide means for securing a dispenser to a surface that do not suffer from repeated use or whose original state can be easily restored.

U.S. Pat. No. 7,530,472 B2 provides a wipes dispensing system including a dispenser and a mounting element for mounting the dispenser to a mounting surface (wall). This U.S. patent teaches that a variety of attachment means is possible. The wipes dispenser may be releasably mounted to a fixed surface by mounting elements such as, for example, Velcro tapes, suction cups, magnets, screws, removable double-sided foam or other tapes, micro suction, static cling films or by means of a removable mounting bracket. Non-tacky static cling films provide rather low adhesive forces. Suction cups or micro-suction devices tend to loose their adhesion to the mounting surface with time. Further, they typically require perfectly smooth surfaces to show the necessary adhesion. A micro suction attachment for a hanky container with a plurality of nanosize recesses is also described in DE 20 2008 005 552 U1.

U.S. Pat. No. 6,561,378 B1 concerns a tissue container which resists unwanted movement when placed upon a flat surface due in part to a non-skid friction enhancement device that is affixed to the lower surface of the container. The tissue container may also be releasably affixed to an object or surface by way of adhesive such that the container resists movement when a tissue is pulled from the container. The adhesive is permanently provided in the form of adhesive patches which may be covered with a releasable film layer. The soiling of these adhesive patches also tends to considerably lower their adhesive effect. However, the forces generated by pulling a tissue from a tissue container are not comparable to the tilting forces acting upon a roll dispenser when the sheet material is tugged against the teeth around the dispensing opening and torn. Further, a permanent fixation of adhesive patches prevents replacement thereof if these are damaged or lose their function after very frequent use.

It is one object of the present invention to provide suitable means that allow one-handed dispending of sheet material from a portable roll dispenser.

It is one further object of the present invention to provide releasable attachment means for a portable roll dispenser that do not leave adhesive residue behind when the dispenser is removed after attachment.

It is one further object of the present invention to provide releasable attachment means for a portable roll dispenser that do function on a wide range of different surfaces.

It is one further object of the present invention to provide easy-to-use releasable attachment means for a portable roll dispenser wherein the attachment force does not substantially drop upon repeated use or at least can be easily restored.

SUMMARY OF THE PRESENT INVENTION

The present invention relates to the use of a tacky mat made from a tacky elastomeric polymer composition for releasably securing a portable roll dispenser to a surface.

Surprisingly it has been found that mats of this type (in the following also "tacky elastomeric mat") are particularly suited for releasably (removably) securing a wipe dispenser to a vertical or preferably horizontal surface.

Tacky elastomeric mats generate sufficiently strong adhesive forces to the dispenser surface and the surface to which the dispenser is to be secured to allow one-handed dispensing of sheet material from a portable roll dispenser.

In contrast to adhesive tapes including a backing material, they do not leave adhesive residue behind when the dispenser is removed after attachment.

The present inventors further found that tacky elastomeric mats show sufficient adhesiveness on a wide range of different surfaces, especially on surface materials typically present in household and industrial surfaces.

Unexpectedly, the attachment force between tacky elastomeric mats and surface materials typically present in household and industrial surfaces does not substantially drop with time and/or upon repeated use. Should this nonetheless happen, the adhesive force can be easily restored by washing the tacky elastomeric mat with water, optionally with water and soap. This possibility is not available for commonly used adhesive coatings or adhesive tapes.

One further aspect of the invention relates to a portable roll dispenser on which a tacky mat is arranged, wherein the mat is made from a tacky elastomeric polymer composition, and wherein the mat and/or the dispenser are preferably defined as in the following description and the claims.

The dispenser may include a housing defining an interior cylindrical volume for containing a roll of sheet material, preferably a roll of centre-fed sheet material. "Cylindrical" is to be understood in a broad sense and covers as well a conical deviation from the vertical and parallel arrangement of ideal cylinder walls. In order to ensure that the roll of sheet material can be fitted into the housing this conical deviation (inclination) is preferably small, e.g. less than 15°. A dispensing opening of the dispenser may be arranged at or above a top end face of the roll/cylindrical volume. The mat may be arranged on a base of the dispenser positioned at or below a bottom end of the roll/cylindrical volume. The dispenser may be stuck to a suitable horizontal surface with the base adjacent the surface by pressing the mat against the horizontal surface. In this orientation, a central longitudinal axis of the cylindrical volume extends normally from the horizontal surface. An inside surface of the base is arranged to provide a seat for the roll of sheet material. The base may include a recess into which the tacky mat is positioned, wherein the mat projects so as to come into contact with a horizontal surface upon which the dispenser is stood. The dispenser may be shaped so that a housing part for containing the roll is substantially cylindrical when viewed from outside the housing. A dispensing opening of the dispenser may define a central axis extending therethrough that is offset from a central longitudinal axis of the cylindrical volume. The axes may intersect. The axes may define an angle between them of at least 10° and up to 90°, at least 20° and up to 80°, at least 30° and up to 70°, and at least 40° and up to 60°.

EMBODIMENTS OF THE INVENTION

Figure 1:
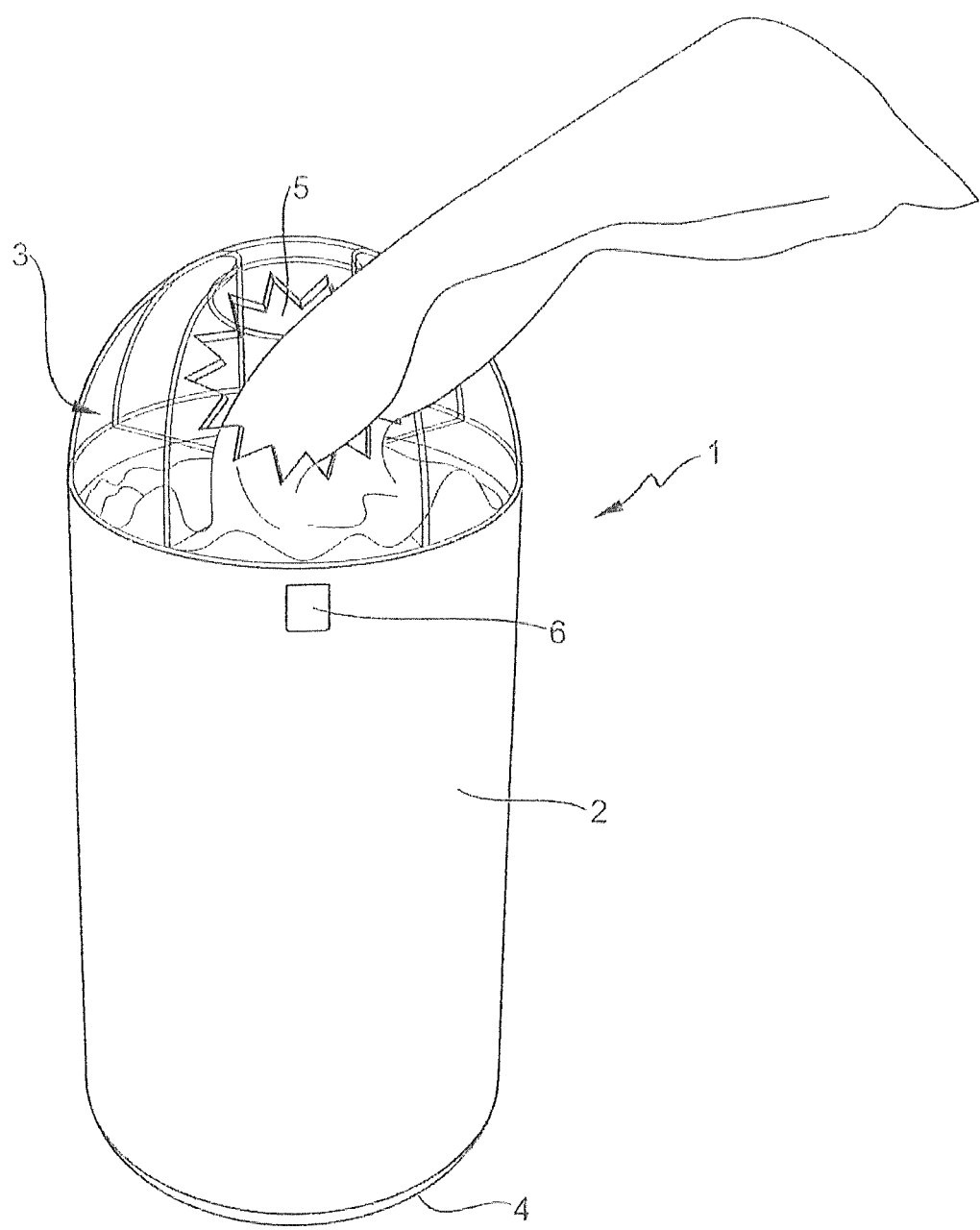
FIG. 1 shows a dispenser used in an embodiment of the present invention. The dispenser includes a cylindrical housing (with a slight conical inclination) defining an interior area containing a roll of centre-fed web material. The dispenser also includes a dome part attached to a top of the housing. The dome part includes a dispenser opening through which the web material is fed and a handle opening for receipt of a user's finger for carrying the dispenser. The dispenser is shown in a position in which a base of the dispenser is releasably secured to a horizontal surface so that a central longitudinal axis of the cylindrical volume defined by the dispenser housing extends normally to the table surface. A tacky mat for releasably securing the base of the dispenser to the table surface is not shown in FIG. 1.

1. Use of a tacky mat made from a tacky elastomeric polymer composition for releasably securing a portable roll dispenser to a surface.
2. Use according to item 1, wherein the mat has a thickness of at least 0.5 mm, preferably from 1 to 5 mm, more preferably from 1.5 to 3 mm.
3. Use according to item 1 or 2, wherein the tacky elastomeric polymer composition comprises or consists of
   (A) one or more elastomeric polymers, preferably elastomeric polyurethane polymers, which optionally have been produced in the presence of more than 0 to 5% by weight, for instance from 0.3 to 2.0% by weight of a catalyst,
   (B) optionally filler in an amount of more than 0 to less than 50% by weight, preferably of from 1 to 30% by weight,
   (C) optionally additives, which are preferably selected from coloring agents, water-binding substances, flame-proofing agents, UV stabilizers, plasticizers, and tackifiers, in a total amount of more than 0 to 25% by weight, preferably of from 0.5 to 10% by weight,
   each based on the total weight of the composition.
4. Use according to any of items 1, 2 or 3, wherein the one or more elastomeric polymers (A) are selected from elastomeric polyurethane polymers and preferably one of the following conditions is met:
   (i) no filler is present, optionally plasticizers and/or tackifiers are present as sole additives, and the elastomeric polymer composition is transparent or translucent,
   (ii) filler and/or coloring agents are present, optionally plasticizers and/or tackifiers are present as sole further additives, and filler and/or coloring agents have been selected so as provide the mat with a color matching the color of the outer surface of the dispenser on which the mat is to be arranged.
5. Use according to any of items 1, 2, 3, or 4 wherein the surface is a horizontal surface.
6. Use according to item 5 wherein the tacky mat is arranged on the bottom of the dispenser, and the height of the dispenser is greater than the largest diameter of its bottom area and wherein preferably the ratio of height/largest diameter of the bottom area is at least 1.2, e.g. at least 1.5, e.g. at least 1.6, e.g. at least 1.7.
7. Use according to item 5 or 6 wherein the tacky mat is arranged on the bottom of the dispenser, wherein the dispenser has a substantially cylindrical volume and the dispensing opening of the dispenser is arranged at or above a top end face of the cylindrical volume, and wherein the dispensing opening of the dispenser preferably defines a central axis extending therethrough that is offset from a central longitudinal axis of the cylindrical volume.
8. Use according to any of items 5, 6 or 7, wherein the dispenser has an essentially circular bottom and the mat is provided in a recess in the bottom surface, wherein the recess is preferably to be understood relative to an annular rim, and the thickness of the tacky mat is greater than the clearance between a bottom of the recess and the lower end of the rim or the bottom surface extending about the recess.

9. Use according to any of items 5, 6, 7, or 8, wherein the dispensing opening includes teeth at least partly around the opening.
10. Use according to any of items 1, 2, 3, 4, 5, 6, 7, 8 or 9, wherein the dispenser, preferably at least its bottom, is made of a plastic material that contains, in addition to carbon and hydrogen atoms, polar structural units preferably selected from carboxy (O—C=O), amide (N—C=O) and nitrile (CN) and wherein the tacky elastomeric polymer composition preferably is defined as in item 3 or 4.
11. Use according to any of items 1, 2, 3, 4, 5, 6, 7, 8, 9, or 10, wherein the first and the second side of the mat both have a smooth surface.
12. Use according to any of items 1, 2, 3, 4, 5, 6, 7, 8, 9, 10 or 11, wherein the first side of the mat which is to be arranged on the dispenser, preferably on its bottom, is smooth and at least a part of the second side is provided with a visible surface structure which is preferably selected from at least one projection, surface texture, and at least one recess.
13. Use according to any of items 1, 2, 3, 4, 5, 6, 7, 8, 9, 10, 11 or 12, wherein the mat has an area ($A_{mat}$) smaller than the total projected area of the bottom side ($A_{bs}$) of the dispenser, wherein the ratio ($A_{mat}$)/($A_{bs}$) is preferably 0.8 to 0.99, and wherein the mat preferably is essentially circular.
14. Use according to any of items 1, 2, 3, 4, 5, 6, 7, 8, 9, 10, 11, 12 or 13, wherein the mat has a durometer hardness on the Shore(OO)scale in the range of from 20 to 85, more preferably from 35 to 75, even more preferably from 45 to 65.
15. Portable roll dispenser on which a tacky mat is arranged wherein the mat is made from a tacky elastomeric polymer composition, and wherein the mat and/or the dispenser are preferably defined as in any of items 1, 2, 3, 4, 5, 6, 7, 8, 9, 10, 11, 12, 13 or 14.

DETAILED DESCRIPTION OF THE INVENTION

One aspect of the present invention relates to the use of a tacky mat made from a tacky elastomeric polymer composition for releasably securing a portable roll dispenser to a surface.

This use can also be described as a method for releasably securing a portable roll dispenser to a surface comprising the steps of
(1) arranging a tacky mat made from a tacky elastomeric polymer composition on a planar (flat) surface of portable roll dispenser,
(2) securing the dispenser to a surface and removing the dispenser again from this surface, and
(3) repeating step (2).

The term "mat" is to be understood as relating to a free-standing, self-supported, three-dimensional but flat shape. The mat is solid enough to maintain its shape in a free-standing manner without a container. The mat is elastic and coherent and thus flexible and capable of being deformed without being flowable. It is resilient such that the mat can be compressed under an applied force. The mat preferably has a durometer hardness in the range of 20 to 85, more preferably of 35 to 75, even more preferably 40 to 70, e.g. 45 to 65, on the Shore(OO)scale according to ASTM D2240-05 (reapproved 2010).

The type of elastomeric composition used therein and the thickness of the mat are selected such as to provide these properties. The thickness is typically at least 0.1 mm, preferably at least 0.5 mm, more preferably a least 1 mm, e.g. 0.5 to 10 mm, 1 to 5 mm, or 1.5 to 3 mm.

The tacky elastomeric mat does not include a reinforcing backing as used for instance in adhesive tapes. Its tackiness is mainly achieved by the choice of the elastomeric polymer composition and, as will be explained later, can be fine-tuned by imparting the surface of the lower side, i.e. the side facing away from the dispenser, with texture and/or recesses. However, its tackiness is not related to surface structures such as suction cups that create a suction effect. Such surface structures as occurring in so-called micro suction pads are absent.

The elastomeric polymer composition is preferably not in a foamed state because this could reduce the surface and the adhesive force of the tacky mat.

The elastomeric polymer composition comprises as main component one or more elastomers.

Wherever the present description and the claims use the term "comprising" in connection with a specific embodiment, this language is intended to disclose as well further embodiments in which "comprising" is substituted for "consisting of" or "consisting essentially of" as long as this does not contradict the technical context.

"Main component" means that one or more elastomers are present in an amount of greater than 50% by weight, for instance in amounts of at least 60% by weight, at least 70% by weight, at least 80% by weight, at least 90% by weight or at least 95% by weight, each based on the total weight of the polymer composition (as being present in the tacky elastomeric mat).

The elastomer can be selected from rubber materials. The elastomer may be a single homo- or copolymer or a mixture of homo- and/or copolymers. These homo- and/or copolymers are preferably selected from vinyl-based polymers, silicon rubber polymers and elastomeric polyurethane.

The tacky elastomeric mat can be produced by casting or molding, e.g. heat molding, a suitable starting composition, followed by an optional post-curing step. The tacky elastomeric mat is preferably a molded article, which comprises preferably polyurethane as elastomeric main component.

The elastomeric polymer composition may also contain catalysts, fillers and additives. Catalysts, fillers and additives can also be completely omitted in an elastomeric polymer composition consisting of one or more elastomers.

Depending on the type of elastomer, it may be desirable to use no catalyst or from more than 0 (e.g. 0.1%) to 5% by weight, for instance from 0.3 to 2.0% by weight of one or more catalysts based on the total weight of the elastomeric polymer composition.

Fillers which are also optionally used in the manufacture of the mat (and can be absent) can be either inorganic or organic fillers. Example of inorganic fillers which may be mentioned include silicate minerals, metal salts, inorganic pigments and glass, glass microspheres, hollow glass microspheres, etc. It is also possible to use natural and/or synthetic fibrous materials such as glass fibers. Organic fillers include for instance polymer-based powders and hollow microspheres of organic origin. If used, the fillers are added to the reaction mixture in amounts of more than 0 (e.g. 0.5%) to less than 50% by weight and preferably of from 1 to 30% by weight based on the total weight of the elastomeric composition.

Other additives which are optionally used (and can be absent, each or altogether) include for example coloring agents, water-binding substances, flame-proofing agents, UV stabilizer, plasticizers, and/or tackifiers.

Examples of plasticizers which may be preferably used for polyurethanes include esters of polybasic carboxylic acids with monohydric alcohols. Suitable esters and alcohol components are described in section [0031] of US 2007/0066788 A1. Other suitable plasticizers are esters of these alcohols with phosphoric acid. The plasticizers can also be so-called polymeric plasticizers, for example polyesters of adipic, sebacic and/or phthalic acid such as octyl phthalate or alkyl sulfonic acid esters of phenol, i.e. phenyl paraffin sulfonate.

Should the elastomeric main component(s) not yet provide the necessary tack, tackifiers can be added. Depending on the nature of the elastomeric main component(s), a suitable tackifier can be selected from Rosin resins, hydrocarbon resins, terpene resins and phenolsulfonic acid esters such as Mesamoll® tackifier for polyurethane gels.

Depending on the type of elastomeric main component(s) and the desired properties of the tacky mat, these additives are not used at all or incorporated into the elastomeric polymer composition in total amounts of from more than 0 (e.g. 0.1%) to 25% by weight preferably of from 0.5 to 10% by weight, based on the total weight of the composition. In one embodiment, the elastomeric polymer composition comprises only the elastomeric main component (optionally made in the presence of catalyst), such as one or more polyurethane polymers, plasticizer and/or tackifier.

Preferably the tacky elastomeric polymer composition comprises or consists of
(A) one or more elastomeric polymers which optionally have been produced in the presence of more than 0 to 5% by weight, for instance from 0.3 to 2.0% by weight of a catalyst or catalyst combination,
(B) optionally filler in an amount of more than 0 to less than 50% by weight, preferably of from 1 to 30% by weight based,
(C) optionally additives, which are preferably selected from more coloring agents, water-binding substances, flame-proofing agents, UV stabilizers, plasticizers, and tackifiers, in a total amount of more than 0 to 25% by weight, preferably of from 0.5 to 10% by weight,
each based on the total weight of the composition.

Preferably the elastomeric polymer composition comprises one or more polyurethane homo- or copolymers as elastomeric main component. The polyurethane is preferably three-dimensionally cross-linked. The polyurethane and the tacky mat comprising the same may have a gel-like appearance and is transparent or translucent (if fillers, pigments, colorants or the like are absent).

Polyurethane-based mats are preferably in the following process:
I. mixing an organic polyisocyanate (A1), e.g. a prepolymer containing free NCO functionality and a (A2) a polyol, e.g. a curative containing at least two free hydroxy functions, optionally (A3) catalyst, optionally (B) filler and optionally (C) (other) additives such as plasticizer and/or tackifier,
II. pouring the resulting mixture in a mat-shaped mold,
III. reacting prepolymer and curative, preferably under heating, to prepare the elastomeric polymer composition comprising polyurethane as main component,
IV. removing the mat from the mold,
V. optionally subjecting the mat to a post-curing treatment.

If heating is conducted in step III, the mold is preferably preheated. The heating temperature then preferably ranges from a temperature above room temperature (20° C.), e.g. 25° C. to 130° C., typically from 70° C. to 130° C. The reaction time is adapted to the heating temperature and may preferably range from 1 min to 3 hours, e.g. 3 min to 1 hour.

One example of a suitable material is a thermosetting polyurethane gel system available as WE 369-1 from Isotech International as described in US 2007/0261274 A1 in connection with the formation of a colorless, transparent self-adhesive heel liner for a shoe. The durometer hardness of the resulting very tacky gel was about 22 Shore(00).

Flexible elastomeric plastic materials that have inherent adhesive properties on their surface are also available from Northstar polymers (USA) under supplier code MPP-V37A. These polyurethane elastomer gels are made by mixing a prepolymer containing free NCO functionality and a curative containing free hydroxy functionality followed by reacting (curing) the mixture over e.g. 5 to 6 hours at room temperature. Several days of post-curing may follow. Heating will accelerate curing and ensure the part integrity when demolding. By changing the ratio of prepolymer and curative the softness of the material can be adjusted.

According to one further embodiment, the elastomeric polyurethane is obtainable by reacting one or more NCO prepolymers and one or more polyol components wherein
A1) the NCO prepolymers comprise the reaction products of one or more polyisocyanates having a functionality of 2.1 to 5, with one or more polyoxyalkylenediol monoalkyl ethers having a molecular weight of 1,000 to 18,000, in which the ratio of NCO groups to OH groups is between 2:1 and 8:1, and
A2) the polyol components have a mean hydroxyl number of 6 to 112 and a functionality of 3 to 8,
in which the isocyanate index of the reaction mixture ranges from 15 to 60.

Elastomeric polyurethanes of this type are known from US 2007/0066788 A1. The term isocyanate index is understood as meaning the equivalent ratio of NCO groups to OH groups, multiplied by 100 as explained in this US application. The polyurethane compositions obtainable by this US application are gel-like, have low durometer hardness, for example Shore(00) below 40, high adhesiveness and a good recovery capacity.

The elastomeric polyurethane may be produced in the presence of
A3) 0 or from more than 0 to 5% by weight, based on the total weight of the reacted polymer composition, of one or more catalysts for catalysing the reaction between isocyanate groups and hydroxyl groups.

After reaction (curing) the resulting elastomeric polymer composition has a gel-like appearance and may consist of the afore-mentioned polyurethane reaction product. The elastomeric polyurethane composition may also contain:
B) 0 or from more than 0 to less than 50% by weight, based on the total weight of the gel mass, of one or more fillers, and
C) 0 or from more than 0 to 25% by weight, based on the total weight of the gel mass, of one or more additives,
wherein the weight percent values are based on the weight of the reacted elastomeric polymer composition.

Suitable polyisocyanates for preparing the NCO prepolymers (A1) are described in paragraph [0020] of US 2007/0066788 A1 and suitable polyoxyalkylenediol monoalkyl ethers in paragraph [0021]. The polyisocyanate has a mean NCO functionality of 2.1 to 5.0 and preferably 2.5 to 3.1.

As polyol component (A2) the same polyols as disclosed in paragraph [0022] and [0023] can be used in the present invention.

The formation of the gel-like polymer composition can optionally be accelerated by the addition of catalysts (A3) of the type described in paragraph [0025] of US 2007/0066788 A1.

Regarding the other components, i.e. the optionally present fillers (B) and (other) additives, reference is made to the above description and the examples given in US 2007/0066788 A1. If fillers are added at all, they are selected such that they do not strongly reduce the tackiness (adhesiveness) of the polyurethane material. For this reason, pyrogenically produced metal oxides are better omitted. In one further embodiment, no fillers are added at all in order to produce a transparent or translucent polymer composition and a transparent or translucent tacky mat.

It has been found that transparent or translucent tacky mats made from a transparent elastomeric polymer composition are particularly well accepted by consumers because the mat is inconspicuous and does not adversely affect the aesthetic appearance of the dispenser. In one alternative embodiment, the polymer composition used for making the tacky mat comprises a pigment or coloring agent whose color matches the color of the outer dispenser surface.

The polymer compositions used in the present invention preferably do not contain water or only small amounts thereof (e.g. less than 5% by weight, preferably less than 1% by weight) even if they have a gel-like appearance.

According to one further embodiment, the polymer composition comprises as sole or main component a polyurethane elastomer obtainable by reacting (A2) a polymeric hydroxy compound with (A1) one organic polyisocyanate in the presence of (A3) a catalyst, preferably an organometallic catalyst selected from nickel, cobalt, manganese, iron, capo and zinc compounds.

Preferably the polymeric hydroxy compound (A2) comprises:

A2') a polyalkylene ether triol or a mixture thereof with a polyalkylene ether diol of phenolic hydroxy or aromatic ring containing amino compound having a low molecular weight of 400 to 1,500, and A2") a polyalkylene ether polyol having a high molecular weight of 2,000 to 6,000, at a (A2'):(A2") molar ratio of 35:65 to 70:30.

Polyurethane elastomers of this type are described in U.S. Pat. No. 4,552,944 and have a suitable low durometer hardness of 40 to 85 on the Shore(00)scale.

As polymeric hydroxy compound those described in column 2, lines 30 to 62 of US 2007/0066788 can be used.

The organic polyisocyanate (A1) which may be used includes, for example, 2,4-tolylene diisocyanate, 2,6-tolylene diisocyanate, and mixtures thereof, diphenylmethane-4,4'-diisocyanate, 3,3'-dimethyl-4,4'-biphenylenediisocyanate, xylylene diisocyanate, dicyclohexylmethane-4,4'-diisocyanate, isophorone diisocyanate, hexamethylene diisocyanate, hydrogenated xylylene diisocyanate, crude tolylene diisocyanate, polymethylene polyphenylisocyanate, isocyanurate modified tolylene diisocyanate, isocyanurate modified diphenylmethane-4,4'-diisocyanate, carbodiimide modified tolylene diisocyanate, and carbodiimide modified diphenylmethane-4,4'-diisocyanate.

The organic polyisocyanate and the polymeric hydroxy compound are preferably reacted at a NCO/OH equivalent ratio of 0.4 to 1.4, more preferably 0.5 to 1.2. Regarding optional components such as filler and additives and their amounts, reference is made to the above description.

Suitable examples of the organometallic catalyst are described in column 2, lines 6 to 21 of U.S. Pat. No. 4,552,944. The preferred quantity in use is 0.01 to 5.0 parts by weight of the polymeric hydroxyl compound.

In one embodiment the mat has a two-layer or multiple layer construction in which the layers are made from different tacky elastomeric polymer compositions. The upper layer to be arranged on a planar (flat) surface of the dispenser, preferably on the dispenser bottom, is chosen such as to exhibit a higher adhesive force vis-à-vis the material of this planar surface than the lower surface vis-à-vis the horizontal surface to which the dispenser is secured. The two or more layers are preferably made from different elastomeric compositions as described before, more preferably from tacky elastomeric compositions comprising polyurethane as main component.

The tacky mat made from the tacky elastomeric polymer composition is used to releasably secure a roll dispenser to a surface. Roll dispensers are used for dispensing sheet material, typically from a roll of wound tissue or nonwoven sheet material. The dispenser may be a centre-fed roll dispenser so that a dispensing opening is arranged to dispense from a centre of an end face of the roll. The dispenser may be elongate along a central longitudinal axis aligned with a central longitudinal axis of the roll. A dispensing opening may be arranged at a top end of the dispenser relative to the central longitudinal axis thereof and the mat is arranged at a bottom end of the dispenser.

A dispenser side of the mat is flat and smooth. An opposite side may be relatively less smooth so as to define a textured side, a discontinuous side or the like. This means that the dispenser side will preferentially stick to the dispenser as compared to the sticking force between the opposite side of the mat and the horizontal surface to which the dispenser is stuck.

The surface material can be selected from materials typically occurring in household and industrial surfaces, such as wood, plastics (e.g. in artificial veneer with wood-like appearance), metal, stone such as granite or marble, ceramics (e.g. in tiles), lacquer (e.g. in lacquer-coated surfaces) or glass.

This surface can be a vertical surface if the housing of the roll dispenser has at least one essentially planar wall or wall part to which the tacky mat can be affixed. This can for instance be the case if the cylindrical housing wall exhibits a projecting planar (flat) surface. If the tacky mat is arranged on this planar wall (part) or surface the dispenser may be releasably secured to a wall, either freely hanging or simultaneously supported by a table or other horizontal surface or simply secured on its side to a horizontal surface. Thus, in one embodiment, a housing defining an interior volume for containing the roll may include a planar surface extending along a central longitudinal axis of the roll and the mat may be applied on the planar surface.

According to one preferred embodiment, the tacky mat is used for releasably securing a roll dispenser to a horizontal surface, e.g. a table, shelf board or other horizontal household or industrial surface. The dispenser includes a housing for containing the roll. It is preferred that the mat is applied on a planar surface extending perpendicular to a central longitudinal axis of the roll so that the dispenser can be stood with the planar surface adjacent a horizontal surface on which the dispenser is stood so that the mat sticks the dispenser to the horizontal surface. In this embodiment, the tacky mat is arranged on the bottom of the dispenser. The roll dispenser has a dispensing opening located at a top portion of the dispenser, wherein the bottom of the dispenser and the top portion are located at opposed ends of a typically cylindrical volume for containing the roll. Suitably, a circular bottom of the dispenser exhibits a smooth planar surface. The mat is preferably contained in a recess defined in a bottom surface of the dispenser and the mat projects marginally relative to the bottom surface so as to contact the horizontal surface when the dispenser is stood on the bottom so that the mat sticks the dispenser to the horizontal surface.

Figure 4:
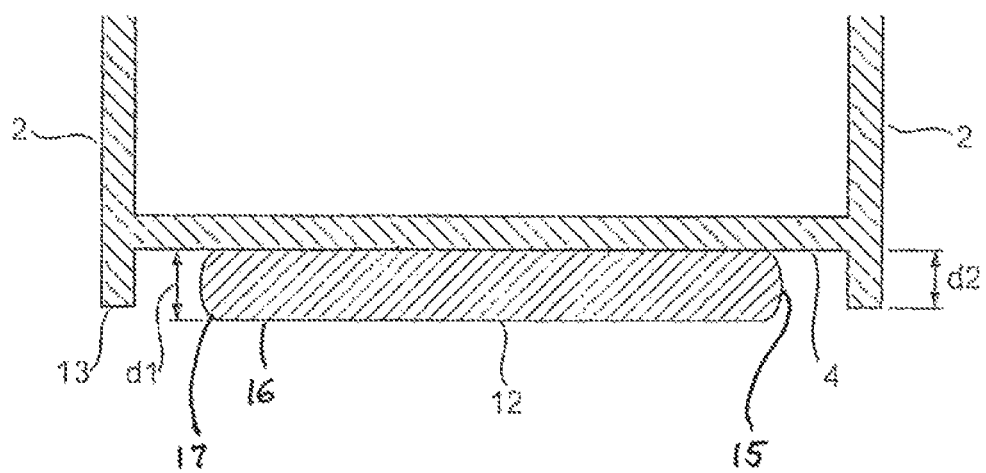
FIG. 4 shows a schematic cross-section of the bottom of the dispenser on which a tacky mat has been arranged.

According to one preferred embodiment the bottom of the dispenser is circular and the bottom surface has been provided with a recess in which the tacky mat 12 can be provided. According to one aspect, the recess is to be understood relative to annular rim 13 extending about the recess as shown in FIG. 4. This rim preferably extends a cylindrical housing wall 2 of the dispenser beyond the recess provided in the bottom 4 of dispenser. The clearance (d2) between the bottom of the recess and the lower end of the rim is then at least as large as the thickness (d1) of the tacky mat 12. It is preferred that the thickness (d1) of the tacky mat 12 (in the uncompressed state) is larger than this clearance (d2). In this manner it is ensured that the tacky mat 12 is sufficiently compressed to develop a strong adhesive force towards the horizontal surface while the dispenser can be tilted just a little to bring the rim 13 into contact with the horizontal surface with reduced risk of tipping the dispenser when the sheet material is torn off. The difference between mat thickness (d1) and rim clearance (d2) is preferably at least 0.1 mm, e.g. at least 0.2 mm, at least 0.3 mm, at least 0.4 mm, or at least 0.5 mm. Possible upper limits for d1−d2 are 2, 1.5 or 1 mm depending on the softness (durometer hardness) of the tacky mat.

The roll dispenser to be used in the present invention is not particularly limited. It can be center-fed (using coreless wound sheet material) or not (using sheet material such as toilet paper or absorbent household paper wound on a core). According to one embodiment of the present invention, the dispenser is suitable for dispensing non-perforated sheet materials. In line with this aspect of the invention, the dispenser is not a toilet roll dispenser.

Preferably, and in contrast to cardboard box dispensers for tissue facials, the height of the roll dispenser is greater than the diameter of the bottom area on which it stands. More preferably, the ratio of height/largest diameter of the bottom area is at least 1.2, e.g. at least 1.5, e.g. at least 1.6, e.g. at least 1.7. The height itself is preferably more than 10 cm, e.g. 20 to 40 cm. Surprisingly, the tacky mat used in the present invention can withstand the leverage forces occurring in roll dispensers with a greater height/diameter ratio and prevent tilting over if the sheet material is removed and torn off. This applies in particular to dispensers having a dispensing opening located at the top of a typically cylindrical housing.

Preferably, the dispenser comprises a handle to allow portability of the dispenser and for releasing the dispenser from the horizontal surface.

It is also preferred that the dispenser comprises an openable part connected to the housing in order to allow the housing to be refilled with a new roll of sheet material.

The dispenser is preferably part of a system comprising the dispenser and a wall mounting part that is to be fixed to a vertical wall, whereby the dispenser is releasably connectable to the wall mounting part to allow the dispenser to be portable when released from the wall mounting part and to be docked at a fixed location when connected to the wall mounting part. In one preferred embodiment, the dispenser is mounted "upside down" to the wall with the dispensing opening pointing downward.

The roll dispenser is preferably a centre-fed roll dispenser which includes a housing that is generally cylindrical and defines a generally cylindrical interior volume for receipt of a centre-fed roll therein. At or above an end face of the cylindrical housing, there is provided a dispensing opening that includes teeth at least partly around the opening. The sheet material is pulled out through the opening from a central lumen through the roll. The sheet material is tugged against the teeth in order to separate a desired amount of sheet material from the roll.

Figure 2:
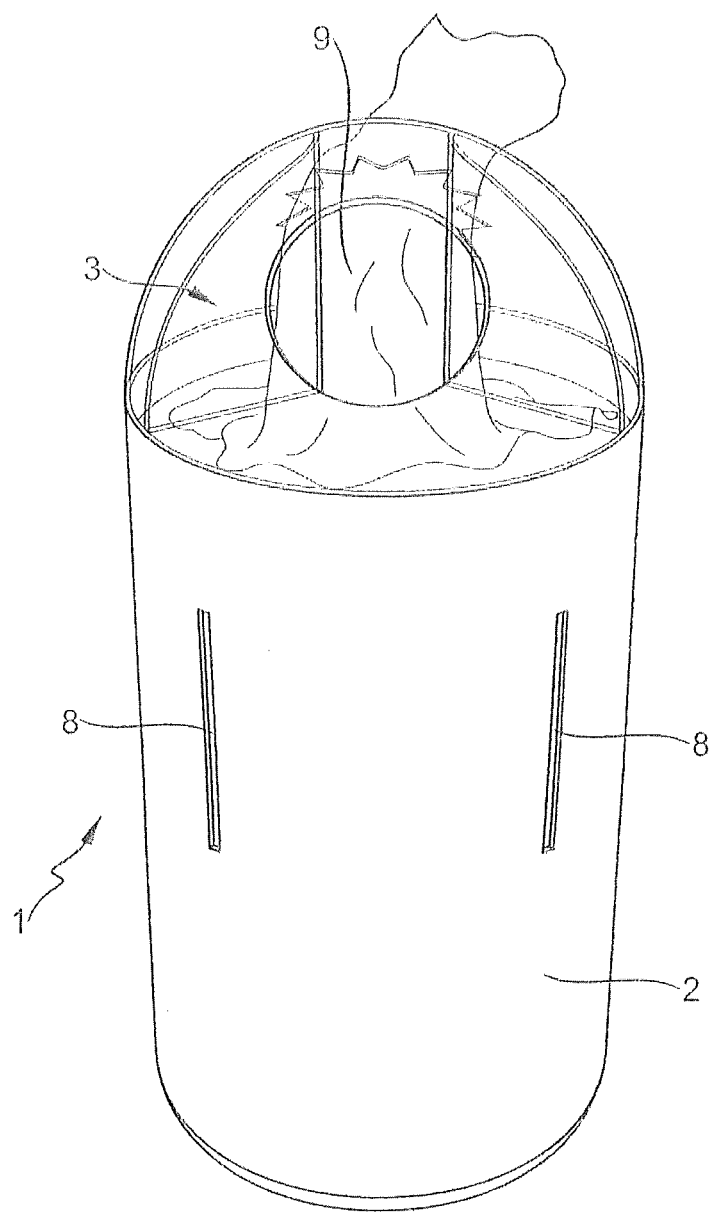
FIG. 2 shows a corresponding view of the dispenser as shown in FIG. 1, except that FIG. 2 shows a rear side of the dispenser, rather than a front side as in FIG. 1. From the rear of the dispenser, the handle opening can be seen, as can first and second longitudinally oriented slots for receipt of projections of a wall mounting bracket.
Figure 3:
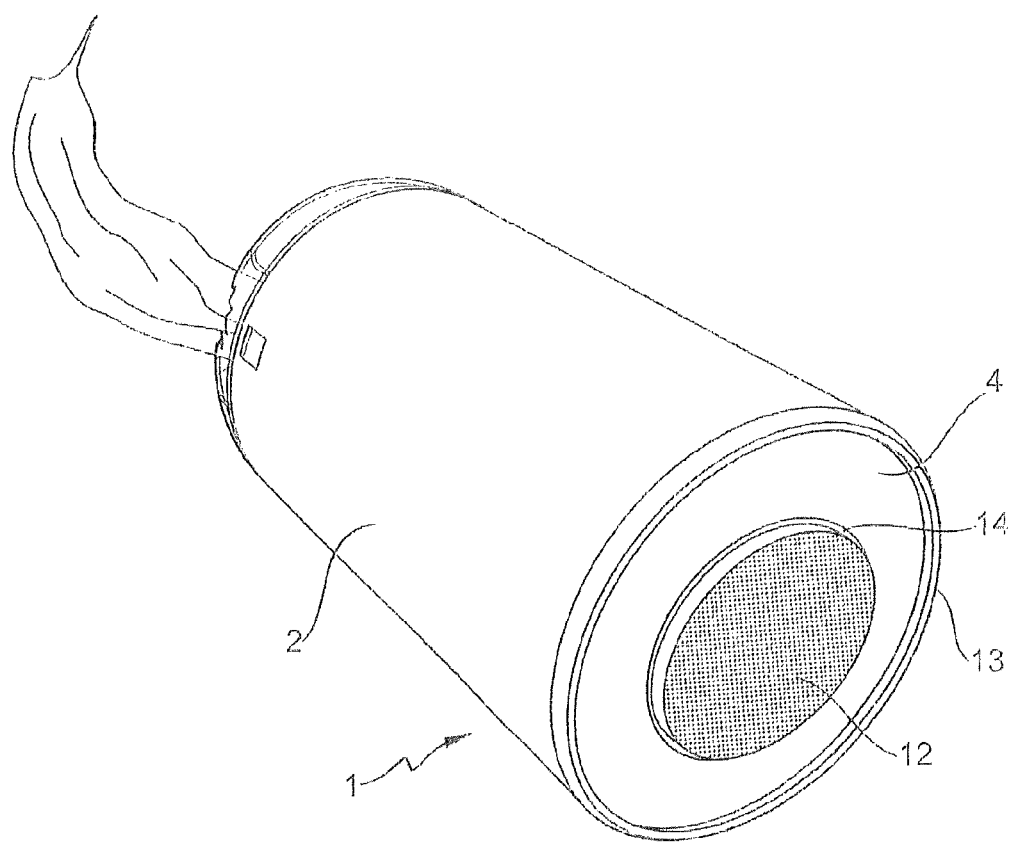
FIG. 3 shows a view of the dispenser so that a base of the dispenser can be seen. In particular, a tacky mat is secured to the base of the dispenser to allow the dispenser to be repeatedly and releasably secured to the table surface.

Preferably, the centre-fed roll-dispenser is constituted as shown in FIGS. 1 to 3.

FIG. 1 shows a dispenser 1 comprising a cylindrical housing 2 and a dome part 3. The cylindrical housing 2 defines a cylindrical interior volume for containing a centre-fed roll of web material for wiping. The web material is preferably a dry web material paper product. The dispenser 1 also includes a base upon which the dispenser 1 can be stood on a table or horizontal surface and a dispensing opening 5 positioned above a top end face of the roll of web material when the dispenser 1 is stood on its bottom 4 on a horizontal surface.

The dispensing opening 5 includes a plurality of triangle shaped teeth against which the sheet material can be forced in a direction perpendicular to the dispensing direction to separate the sheet material from the rest of the roll.

FIG. 1 shows a hole 6 into which a corresponding protrusion 7 of the dome part 3 resiliently snap-fits in order to rotationally lock the dome part 3 to the housing 2. To undo this lock, the corresponding protrusion 7 of the dome part 3 is pressed inwardly to disengage it from the hole 6 in the housing 2 (see also FIG. 7).

The dispensing opening is, in the present specification, considered to be provided on a front side of the dispenser 1 in a plane perpendicular to a central longitudinal axis of the cylindrical housing 2. FIG. 1 shows a view of the dispenser 1 from the front side. FIG. 2 shows a view of the dispenser 1 from a rear side. The rear side of the dispenser 1 includes first and second slots 8 that are longitudinally oriented so as to extend parallel to a central longitudinal axis of the housing 2. The first and second slots 8 are positioned to receive corresponding first and second projections 10 of a wall mounting part 11 (FIG. 4 and further described below). The slots 8 are marginally further spaced apart than the projections 10 so as to require the wall mounting part 11 to resiliently spread open a little in order to engage the slots 8 and the projections 10 to thereby mount the dispenser 1 to the wall mounting part 11.

FIG. 2 also shows a handle opening 9 so as to receive at least one finger, and in the shown embodiment, at least the fore and middle fingers to allow the dispenser 1 to be conveniently carried around. The dispenser 1 is thus portable and is also designed to be fixed to a wall to thereby offer both a wall fixed dispenser 1 and a portable dispenser 1, depending on a user's needs.

FIG. 3 shows a view of the bottom 4 of the dispenser 1, which shows a tacky mat 12 secured to the bottom 4. The bottom 4 includes a rim 13 disposed about a periphery thereof that projects from the rest of the bottom 4, so that the rest of the bottom 4 is recessed relative to the rim 13. The tacky mat 12 projects marginally relative to the rim 13 in order to define a contact surface for the dispenser 1 with the horizontal surface when the dispenser 1 is stood up. The tacky mat 12 is thus arranged in the recess of the rest of the bottom 4 as compared to the rim 13. In this way, a relatively thick tacky mat 12 can be used without the pad projecting too far relative to the rim 13 that a tipping problem is created. The tacky mat 12 is made of materials as described above to allow the dispenser to be repeatedly and releasably secured to the horizontal surface, where the securement is performed by simply pushing the dispenser 1 onto the surface, base first, and the releasing is performed by peeling the pad 12 from the horizontal surface.

The tacky mat 12 is stuck to the bottom 4 by the same sticking mechanism by which the tacky mat 12 works to secure the dispenser 1 to the horizontal surface. The tacky mat 12 preferentially sticks to the bottom 4 for a number of reasons, including the fact that the tacky mat 12 will have been stuck to the base for a longer period of time than to the horizontal surface and the tacky mat material tends to increase its stickiness over time (as compared to other securement means such as suction cups that decrease in securement force over time). Also, the tacky mat 12 can include one or more peripheral grooves on the horizontal surface side and is smooth on the dispenser side, which creates a greater contact surface area with the bottom 4 than the horizontal surface, thereby promoting preferential securement to the dispenser 1 than the horizontal surface.

The housing for containing the roll of sheet material is typically made of polymeric material such as thermoplastic material, sometimes in part also of metallic materials.

The tacky mat shows a good to excellent adhesive force vis-à-vis the vast majority of materials used for making the housing of a roll dispenser. Should it turn out for individual materials that the adhesive force is insufficient, it is one embodiment of the present invention to increase the adhesive force by providing an adhesive between the tacky mat and the dispenser using e.g. a suitable common contact adhesive or two-component adhesive. The resulting adhesive connection may also be permanent.

According to one preferred embodiment of the invention, the use of adhesives, glues or the like for providing an adhesive connection between tacky mat and dispenser is dispensed with. This is desirable because otherwise the tacky mat cannot be easily replaced, for instance if it is damaged.

It has been found by the inventors that tacky mats show a good adhesive force on metallic surfaces and an excellent adhesive force on (typically impact-resistant) polymer materials that are frequently used for dispenser housings. Preferably these polymer do not only contain carbon and hydrogen atoms (as in PE or PP) but, in addition to carbon and hydrogen atoms, polar structural units preferably comprising at least one O or N atom. These are preferably selected from carboxy (O—C═O), amide (N—C═O) and nitrile (CN). As suitable housing materials there can be mentioned for instance polycarbonates, (meth)acrylates, in particular rubber-based acrylates, acrylonitrile polymers, in particular rubber-based acrylonitrile polymers such as ABS (acrylonitrile butadiene styrene), polyurethane or polyamides.

According to one embodiment, the first and the second side of the mat both have a planar and smooth surface. The term "smooth" means that the respective surface is free of projections, surface texture, recesses or the like that are visible with the naked eye. This embodiment is particularly suited for tacky mats displaying a strong (optionally permanent adhesion) vis-à-vis the housing material of the dispenser (typically its bottom material) as in the above-explained embodiment in which the housing material is made from polymers comprising polar structural units.

According to one alternative embodiment, the first side of the tacky mat which is to be adhered to dispenser (typically its bottom) is smooth and at least a part of the second side (optionally the entire second side) is provided with visible structure elements selected from at least one projection, surface texture, and at least one recess. This can be easily achieved by preparing the tacky mat (e.g. one comprising polyurethane as main component) in a corresponding mold. The structure elements lower the contact area between the tacky mat and the surface to which the dispenser is to be secured and ensure that the tacky mat remains affixed to the dispenser when the same is removed from the surface. By means of this surface structure the adhesive force between tacky mat and surface therefore can be adjusted.

Alternatively, this adhesive force can be adjusted by increasing or reducing the size of the tacky mat. Preferably, the tacky mat has an area ($A_{mat}$) smaller than the complete projected area of the bottom side ($A_{bs}$) of the dispenser (including the rim, if present), wherein the ratio ($A_{mat}$)/($A_{bs}$) is preferably 0.8 to 0.99. This applies in particular to the preferred circular embodiments of the tacky mat.

The invention also relates to the following tacky mat which has found to be particularly suitable for securing a dispenser to a surface: a circular tacky mat made from a molded elastomeric polymer composition comprising or consisting of (A) one or more elastomeric polyurethane polymers which optionally have been produced in the presence of more than 0 to 5% by weight, for instance from 0.3 to 2.0% by weight of a catalyst, (B) optionally filler in an amount of more than 0 to less than 50% by weight, preferably of from 1 to 30% by weight based, (C) optionally additives, which are preferably selected from more coloring agents, water-binding substances, flame-proofing agents, UV stabilizers, plasticizers, and tackifiers, in a total amount of more than 0 to 25% by weight, preferably of from 0.5 to 10% by weight, each based on the total weight of the composition.

It is preferred that (i) the first and the second side of the mat both have a planar surface, or (ii) the first side of the mat which can be adhered to a dispenser is planar and at least a part of the second side is provided with a visible surface structure which is preferably selected from projections, surface texture, and recesses.

The dispenser may include a release cover disposed over the tacky mat that has to be removed to stick the dispenser against the table or other surface.

EXAMPLE

A polyol and an isocyanate component of the same type as used for making sticky anti-slip pads used in cars were heated separately and then mixed in a ratio (polyol:isocyanate) ranging from 100:26 to 100:40. Shortly after mixing the two components, the mixture was poured into a mold made from or coated with a material showing a low adhesion to the mixture, such as optionally coated aluminum. The mold had a circular shape with a diameter of about 8 cm. The mold was sufficiently filled with the heated mixture to achieve a mat thickness of about 2-3 mm. The mold was run through an oven heated at 115° C. for a time of about 5 minutes. The resulting cured tacky mat was then removed from the mold and stored on silicone-coated plastic lids which could be piled.

The circular tacky mat was arranged on the bottom of a centre fed roll dispenser as shown in FIGS. 3 and 4. The entire housing of this dispenser including the bottom was made from ABS resin. The tacky mat showed an excellent adhesion to this dispenser but could be easily removed from the bottom by strongly pulling. Reattachment of the sticky mat was possible. The thickness of the mat (2.5 mm) was slightly greater than the clearance (2 mm) between the recess in the bottom surface and the angular rim surrounding the same, as also shown in FIG. 4. The tacky mat includes a vertical wall 15 extending around a periphery thereof and a surface 16 configured to adhere to the horizontal surface, wherein the tacky mat is secured in the recess defined in the bottom surface 4 of the dispenser and the dispenser is placed on the horizontal surface, wherein the tacky mat includes a rounded edge 17 where the vertical wall 15 meets the surface configured to adhere to the horizontal surface.

In a measuring device including a force meter attached at the top of the dispenser the force was measured that was necessary to remove the dispenser from a table surface. In order to simulate the tear off movement in usage the measuring device pulled the dispenser in horizontal direction, i.e. parallel to the table surface on which the dispenser stood. Surprisingly, it was found that the corresponding resistance force against release increased with time. Hence, the resistance force measured after the dispenser had been secured to the surface for 180 seconds was typically higher than the corresponding force measured after 20 seconds attachment time. Further, it was noted that, vis-à-vis a vast range of materials including wood, metal, tile, granite, wax wood, marble, PP, glass, resistant forces above 3 kg, typically above 6 kg could be reached.

The invention claimed is:

1. A method of releasably securing a portable roll dispenser to a horizontal surface, the method comprising:
   providing a tacky mat made from a tacky elastomeric polymer composition, the tacky elastomeric polymer composition providing an adhesive force that secures the dispenser to the horizontal surface;
   containing the mat in a recess defined in a bottom surface of the dispenser such that the mat projects sufficiently from the bottom surface so as to contact the horizontal surface when the dispenser is stood on the bottom;
   sticking the dispenser to the horizontal surface with the mat,
   removing the dispenser from the horizontal surface after a period of time; and
   again sticking the dispenser to the same or another horizontal surface,
   wherein the tacky mat includes a vertical wall extending around a periphery thereof and a surface configured to adhere to the horizontal surface, wherein the tacky mat is secured in the recess defined in the bottom surface of the dispenser and the dispenser is placed on the horizontal surface, wherein the tacky mat includes a rounded edge where the vertical wall meets the surface configured to adhere to the horizontal surface.

2. The method according to claim 1, wherein the mat has a thickness of at least 0.5 mm.

3. The method according to claim 1, wherein the mat has a thickness of from 1 to 5 mm.

4. The method according to claim 1, wherein the mat has a thickness of from 1.5 to 3 mm.

5. The method according to claim 1, wherein the tacky elastomeric polymer composition comprises:
   (A) one or more elastomeric polymers;
   (B) optionally, a filler in an amount of more than 0 to less than 50% by weight, based on the total weight of the composition; and
   (C) optionally, at least one additive from coloring agents, water-binding substances, flame-proofing agents, UV stabilizers, plasticizers, and tackifiers, in a total amount of more than 0 to 25% by weight, based on the total weight of the composition.

6. The method according to claim 5, wherein the one or more elastomeric polymers is an elastomeric polyurethane polymer.

7. The method according to claim 6, wherein the one or more elastomeric polymers have been produced in the presence of more than 0 to 5% by weight of a catalyst.

8. The method according to claim 6, wherein the one or more elastomeric polymers have been produced in the presence of more than 0.3 to 2.0% by weight of a catalyst.

9. The method according to claim 5, wherein the one or more elastomeric polymers comprises filler in an amount of more than 0 to less than 50% by weight.

10. The method according to claim 5, wherein the one or more elastomeric polymers comprises filler in an amount of from 1 to 30% by weight.

11. The method according to claim 1, wherein the tacky elastomeric polymer composition comprises at least one additive selected from coloring agents, water-binding substances, flame-proofing agents, UV stabilizers, plasticizers, and tackifiers, in a total amount of more than 0 to 25% by weight, based on the total weight of the composition.

12. The method according to claim 1, wherein the tacky elastomeric polymer composition comprises at least one additive selected from coloring agents, water-binding substances, flame-proofing agents, UV stabilizers, plasticizers, and tackifiers, in a total amount of more than 0.5 to 10% by weight, based on the total weight of the composition.

13. The method according to claim 2, wherein the tacky elastomeric polymer composition comprises:
   (A) one or more elastomeric polymers;
   (B) optionally, a filler in an amount of more than 0 to less than 50% by weight, based on the total weight of the composition;
   (C) optionally, at least one additive selected from coloring agents, water-binding substances, flame-proofing agents, UV stabilizers, plasticizers, and tackifiers, in a total amount of more than 0 to 25% by weight, based on the total weight of the composition.

14. The method according to claim 1, wherein the tacky elastomeric polymer composition consists of:
   (A) one or more elastomeric polyurethane polymers, which have been produced in the presence of more than 0 to 5% by weight of a catalyst,
   (B) filler in an amount of more than 0 to less than 50% by weight, based on the total weight of the composition; and
   (C) at least one additive selected from coloring agents, water-binding substances, flame-proofing agents, UV stabilizers, plasticizers, and tackifiers, in a total amount of from 0.5 to 10% by weight, based on the total weight of the composition.

15. The method according to claim 5, wherein the one or more elastomeric polymers are selected from elastomeric polyurethane polymers and one of the following conditions is met:
   (i) no filler is present, and the elastomeric polymer composition is transparent or translucent,
   (ii) filler and/or coloring agents are present, and the filler and/or coloring agents have been selected so as provide the mat with a color matching a color of the outer surface of the dispenser on which the mat is to be arranged.

16. The method according to claim 5, wherein the one or more elastomeric polymers are selected from elastomeric polyurethane polymers and one of the following conditions is met:

(i) plasticizers and/or tackifiers are present as sole additives, and the elastomeric polymer composition is transparent or translucent, (ii) filler and/or coloring agents are present, optionally plasticizers and/or tackifiers are present as sole further additives, and the filler and/or coloring agents have been selected so as provide the mat with a color matching a color of the outer surface of the dispenser on which the mat is to be arranged.

17. The method according to claim 1, wherein the tacky mat is arranged on the bottom of the dispenser, and the height of the dispenser is greater than a largest diameter of its bottom area, and wherein the ratio of height/largest diameter of the bottom area is at least 1.2.

18. The method according to claim 1, wherein the tacky mat is arranged on the bottom of the dispenser, and the height of the dispenser is greater than a largest diameter of its bottom area, and wherein the ratio of height/largest diameter of the bottom area is at least 1.7.

19. The method according to claim 1, wherein the tacky mat is arranged on the bottom of the dispenser, wherein the dispenser has a substantially cylindrical volume and a dispensing opening of the dispenser is arranged at or above a top end face of the cylindrical volume, and wherein the dispensing opening of the dispenser defines a central axis extending therethrough that is offset from a central longitudinal axis of the cylindrical volume.

20. The method according to claim 1, wherein the dispenser has an essentially circular bottom and wherein said recess is to be understood relative to an annular rim, and the thickness of the tacky mat is greater than the clearance between a bottom of the recess and a lower end of the rim or the bottom surface of the dispenser extending about the recess.

21. The method according to claim 1, wherein the dispenser comprises a dispensing opening and the dispensing opening includes teeth at least partly around the opening.

22. The method according to claim 1, wherein the bottom surface of the dispenser is made of a plastic material that contains, in addition to carbon and hydrogen atoms, polar structural units selected from carboxy (O—C=O), amide (N—C=O) and nitrile (CN).

23. The method according to claim 1, wherein the mat has two sides and both sides of the mat have a smooth surface.

24. The method according to claim 1, wherein a first side of the mat which is to be arranged on the dispenser, is smooth and at least a part of a second side is provided with a visible surface structure which is selected from at least one projection, surface texture, and at least one recess.

25. The method according to claim 1, wherein the mat has an area ($A_{mat}$) smaller than the total projected area of the bottom side ($A_{bs}$) of the dispenser, wherein the ratio ($A_{mat}$)/($A_{bs}$) is 0.8 to 0.99, and wherein the mat is essentially circular.

26. The method according to claim 1, wherein the mat has a durometer hardness on the Shore(00)scale in the range of from 20 to 85.

27. The method according to claim 1, wherein the mat has a durometer hardness on the Shore(00)scale in the range of from 45 to 65.

28. The method according to claim 1, wherein the tacky mat consists of the tacky elastomeric polymer composition.

29. The method according to claim 1, wherein the tacky mat is configured to enable the adhesive force to be restored by washing the tacky mat with water, optionally with water and soap.

30. The method according to claim 1, wherein the tacky mat comprises a first side adhered to the dispenser, and a second side configured to adhere the disperser to the horizontal surface, wherein the first side has a first contact area with the dispenser, wherein the second side has a second contact area with the horizontal surface, wherein the first contact area is greater than the second contact area.

31. The method according to claim 30, wherein the second side comprises structural elements which result in the second contact area being less than a surface area of the second side.

32. The method according to claim 1, wherein the tacky mat is circular.

33. A method of releasably securing a portable roll dispenser to a horizontal surface, the method comprising:

providing a tacky mat consisting of a tacky elastomeric polymer composition, the tacky elastomeric polymer composition providing an adhesive force that secures the dispenser to the horizontal surface;

containing the mat in a recess defined in a bottom surface of the dispenser such that the mat projects sufficiently from the bottom surface so as to contact the horizontal surface when the dispenser is stood on the bottom;

sticking the dispenser to the horizontal surface with the mat, removing the dispenser from the horizontal surface after a period of time; and again sticking the dispenser to the same or another horizontal surface;

wherein the tacky mat includes a vertical wall extending around a periphery thereof and a surface configured to adhere to the horizontal surface, wherein the tacky mat is secured in a recess defined in a bottom surface of the dispenser and the dispenser is placed on the horizontal surface, wherein the tacky mat includes a rounded edge where the vertical wall meets the surface configured to adhere to the horizontal surface.

34. The method according to claim 33, wherein the tacky elastomeric polymer composition consists of:

(A) one or more elastomeric polymers;

(B) optionally, a filler in an amount of more than 0 to less than 50% by weight, based on the total weight of the composition; and (C) optionally, at least one additive selected from coloring agents, water-binding substances, flame-proofing agents, UV stabilizers, plasticizers, and tackifiers, in a total amount of more than 0 to 25% by weight, based on the total weight of the composition.

35. The method according to claim 33, wherein the tacky mat is configured to enable the adhesive force to be restored by washing the tacky mat with water, optionally with water and soap.

36. The method according to claim 33, wherein the tacky mat comprises a first side adhered to the dispenser, and a second side configured to adhere the disperser to the horizontal surface, wherein the first side has a first contact area with the dispenser, wherein the second side has a second contact area with the horizontal surface, wherein the first contact area is greater than the second contact area.

37. The method according to claim 36, wherein the second side comprises structural elements which result in the second contact area being less than a surface area of the second side.

38. A portable roll dispenser comprising a tacky mat arranged in a recess defined in a bottom surface of the dispenser, wherein the mat is made from a tacky elastomeric polymer composition, the tacky elastomeric polymer composition providing an adhesive force that secures the dispenser to a contact surface, and the mat projects sufficiently from the bottom surface so as to contact a horizontal surface when the dispenser is stood on the bottom so that the mat sticks the dispenser to the horizontal surface, wherein the adhesive force of the tacky mat does not drop to a non-functional level when the tacky mat is repeatedly removed from and secured to a contact surface, wherein the tacky mat includes a vertical wall extending around a periphery thereof and a surface configured to adhere to the horizontal surface, wherein the tacky mat is secured in the recess defined in the bottom surface of the dispenser and the dispenser is configured to be placed on the horizontal surface, wherein the tacky mat includes a rounded edge where the vertical wall meets the surface configured to adhere to the horizontal surface.

39. A portable roll dispenser comprising a tacky mat arranged in a recess defined in a bottom surface of the dispenser, wherein the mat is made from a tacky elastomeric polymer composition, the tacky elastomeric polymer composition providing an adhesive force that secures the dispenser to a contact surface, wherein the mat projects sufficiently from the bottom surface so as to contact a horizontal surface when the dispenser is stood on the bottom so that the mat sticks the dispenser to the horizontal surface, wherein the mat comprises:
(A) one or more elastomeric polymers;
(B) optionally, a filler in an amount of more than 0 to less than 50% by weight, based on the total weight of the composition; and
(C) optionally, at least one additive selected from coloring agents, water-binding substances, flame-proofing agents, UV stabilizers, plasticizers, and tackifiers, in a total amount of more than 0 to 25% by weight, based on the total weight of the composition wherein the adhesive force of the tacky mat does not drop to a non-functional level when the tacky mat is repeatedly removed from and secured to a contact surface, wherein the tacky mat includes a vertical wall extending around a periphery thereof and a surface configured to adhere to the horizontal surface, wherein the tacky mat is secured in the recess defined in the bottom surface of the dispenser and the dispenser is configured to be placed on the horizontal surface, wherein the tacky mat includes a rounded edge where the vertical wall meets the surface configured to adhere to the horizontal surface.

* * * * *